United States Patent
Reznik

(10) Patent No.: US 8,248,660 B2
(45) Date of Patent: Aug. 21, 2012

(54) EFFICIENT DIFFUSION DITHERING USING DYADIC RATIONALS

(75) Inventor: Yuriy Reznik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 11/957,249

(22) Filed: Dec. 14, 2007

(65) Prior Publication Data

US 2009/0153907 A1    Jun. 18, 2009

(51) Int. Cl.
*H04N 1/40*      (2006.01)
*G06K 9/36*      (2006.01)

(52) U.S. Cl. .................. 358/3.04; 382/237; 382/252

(58) Field of Classification Search ................... None
See application file for complete search history.

(56) References Cited

U.S. PATENT DOCUMENTS

| | | | |
|---|---|---|---|
| 5,621,542 A * | 4/1997 | Ohta et al. ................ | 358/3.03 |
| 5,907,711 A * | 5/1999 | Benitez ..................... | 717/145 |
| 6,157,459 A * | 12/2000 | Shiota et al. ............. | 358/1.15 |
| 6,307,647 B1 | 10/2001 | Cheung et al. | |
| 6,714,204 B2 * | 3/2004 | Ishida et al. ............. | 345/522 |
| 7,043,089 B2 * | 5/2006 | Ballard ..................... | 382/237 |
| 7,513,589 B2 * | 4/2009 | Eldar et al. ............... | 347/15 |
| 7,518,754 B2 * | 4/2009 | Cooper et al. ........... | 358/3.03 |
| 2005/0259884 A1 | 11/2005 | Murakami et al. | |
| 2006/0077466 A1 | 4/2006 | Ishii et al. | |
| 2007/0168410 A1 | 7/2007 | Reznik | |
| 2007/0200738 A1 | 8/2007 | Reznik et al. | |

FOREIGN PATENT DOCUMENTS

EP    0664643 A2    7/1995

OTHER PUBLICATIONS

Foley, J.D. and A. Van Dam, "Fundamentals of Interactive Computer Graphics", 1982, Addison-Wesley, Reading, Massachusetts. p. 597-602.
Foley, J.D., A. Van Dam, S.K. Feiner, and J.F. Hughes, "Computer Graphics: Principles and Practice", 1990, Addison-Wesley, Reading, Massachusetts. Chapter 13, pp. 568-569, 572, 599.
Bayer, B.E., "An Optimum Method for Two-Level Rendition of Continuous Tone Pictures", IEEE International Conference on Communications, Conference Records, 1973, pp. 26-11 to 26-15.
Pappas, T.N. and Neuhoff, D.L., "Printer Models and Error Diffusion", IEEE Transactions on Image Processing, Jan. 1995, pp. 66-80, vol. 4, No. 1.
Floyd, R.W. and L. Steinberg, "An Adaptive Algorithm for Spatial Gray Scale", International Symposium Digest of Technical Papers, 1975, pp. 36-37, vol. 1975m.

(Continued)

*Primary Examiner* — Twyler Haskins
*Assistant Examiner* — Christopher D Wait
(74) *Attorney, Agent, or Firm* — Brent A. Boyd

(57) ABSTRACT

Diffusion dithering can be performed efficiently by applying a set of diffusion filter weights with one or more shift, add, and/or subtract operations. An existing diffusion filter can be approximated with dyadic rationals, thereby allowing division operations in applying the filter weights to be performed with bit-shifting operations. An algorithm is identified to calculate the product of a set of filter weights and a pixel error, where the algorithm performs the calculations using one or more shift, add, or subtract operations. An exhaustive search of the combinations of operations can be made to find an efficient algorithm to calculate the products.

22 Claims, 5 Drawing Sheets

OTHER PUBLICATIONS

Chau, W.K., Wong, S.K.M, and Wan, S.J., "A Critical Analysis of Dithering Algorithms for Image Processing", IEEE Region 10 Conference on Computer and Communication Systems, Sep. 1990, pp. 309-313, Hong Kong.

Jarvis, J.F., C.N. Judice, and W.H. Ninke, "A Survey of Techniques for the Display of Continuous Tone Pictures on Bi-Level Displays", Computer Graphics and Image Processing, 1976, pp. 13-40, vol. 5.

Kubo, S., "Continuous Color Presentation Using a Low-Cost Ink Jet Printer", Frontiers in Computer Graphics: Proceedings of Computer Graphics Tokyo '84, Springer-Verlag, Tokyo (1985), pp. 344-353.

Heckbert, P., "Color Image Quantization for Frame Buffer Display", Computer Graphics (SIGGRAPH 82), 1982, pp. 297-307, vol. 16.

Crocker, D.L., DHALF.txt, Jun. 20, 1991 (see http://www.efg2.com/Lab/Library/ImageProcessing/DHALF.TXT).

Knuth, D.E.. "Digital Halftones by Dot Diffusion", ACM Transactions on Graphics, Oct. 1987, pp. 245-273, vol. 6, No. 4.

Pavlidis, T., "Algorithms for Graphics and Image Processing", 1982, Computer Science Press, Rockville, Maryland, pp. 50-54.

Rogers, D.F., "Procedural Elements for Computer Graphics", 1985, McGraw-Hill, New York. Chapters 2-17, pp. 161-174.

Rogers, D.F. and J.A. Adams, "Mathematical Elements for Computer Graphics", 1976, McGraw-Hill, New York. Chapters: 1-1, 1-2, 1-3 (pp. 3-6), 1-12 (pp. 32-34).

Ulichney, R., "Digital Halftoning," 1987, The MIT Press, Cambridge, Massachusetts.

European Search Report and Written Opinion—EP20080006437—Search Authority —The Hague, Apr. 21, 2009.

International Search Report and Written Opinion—PCT/US2008/086585, International Search Authority—European Patent Office—Apr. 29, 2009.

Taiwan Search Report—TW097148554—TIPO—Apr. 23, 2012.

\* cited by examiner

EFFICIENT DIFFUSION DITHERING USING DYADIC RATIONALS

BACKGROUND

1. Field

The subject matter herein relates generally to image processing. More particularly, the subject matter relates to performing efficient diffusion dithering using a filter whose weights are dyadic rationals, and applying the weights using one or more shift, add, or subtract operations.

2. Background

When an image is to be represented in a system that has a finite color palette, a color from the palette is selected to represent the color of the original image. Since a finite palette has gaps, the original image's true color may not correspond precisely to any color in the palette, so the selected color may be chosen by rounding the true color to a nearby color in the palette. To the extent that the selected color differs from the original image's true color, a rounding error is realized. Diffusion dithering can be used to distribute the error in the pixel to neighboring or nearby pixels, thereby reducing artifacts or other distortions that would otherwise be caused by the rounding errors.

Diffusion dithering is performed by applying a filter to the rounding error for a pixel and distributing the error according to a filter. The filter has a set of fractions called weights. To distribute a portion of the rounding error to other pixels, each of the weights in the filter is multiplied by the error, and the resulting products are distributed to particular pixels near the pixels whose color value is being rounded. Applying the fractional weights is normally performed using a series of multiply and divide operations or floating point arithmetic, which can be computationally-expensive.

Various filters have been experimentally determined to produce good image results, but many of these filters used fractional weights that are complicated to apply. For example, the Stucki filter uses fractions whose denominator is 42, and the Jarvis filter uses fractions whose denominator is 48. When the denominator is a power of two, the fraction can be applied to an error by multiplying the error by the numerator and then using a fast right-bit-shift operation to divide by the numerator. However, since 42 and 48 are not powers of two, applying fractions with these denominators involves using either a machine's division logic, or floating-point multiplication, both of which are computationally expensive. Moreover, applying the numerator in the fraction to the weight may involve a multiplication operation, which is not as efficient as a shift, add, or subtract operation. On a small device, such as a wireless handset or handheld computer, there may not be sufficient computational power to perform a diffusion dither at an acceptable speed using these expensive operations.

SUMMARY

Diffusion dithering can be performed efficiently by applying diffusion filter weights to a pixel error using one or more shift, add, or subtract operations. A filter can be selected whose fractions are dyadic rationals—i.e., fractions whose denominator is a power of two. Moreover, algorithms can be identified to apply the numerators in the fractions to the pixel errors, using a series of left shift, add, and/or subtract operations. Using the left shift, add, and/or subtract operations to multiply the numerator by the pixel error, and then using a right shift to divide the result by the power-of-two denominator, allows the weight to be applied efficiently to the error.

A filter with weights that are dyadic rationals can be created by using dyadic rationals to approximate the weights in a known filter. As another example, two or more known filters can be combined by taking the arithmetic average of the weights in a given position of each filter, and then dyadic rationals may be used to approximate the resulting averages. These techniques, or any other technique, can be used to create a filter whose weights are dyadic rationals.

Algorithms can be created or identified to apply the numerators in the filter weights to a pixel error, where the algorithms apply the weights using one or more shift, add, and/or subtract operations. One way to create the algorithms is to start with a dictionary that has a base value, and then to add to the dictionary different shift, add, and subtract operations until the dictionary contains operations that are able to reach all of the factors that are used as numerators in the filter. The contents of the dictionary are then saved as an algorithm. Different algorithms to generate the same set of factors can be created. These algorithms can be compared for efficiency, and an algorithm that meets certain efficiency criteria can be used to implement the process of applying the filter weights to error values.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Figure 1:
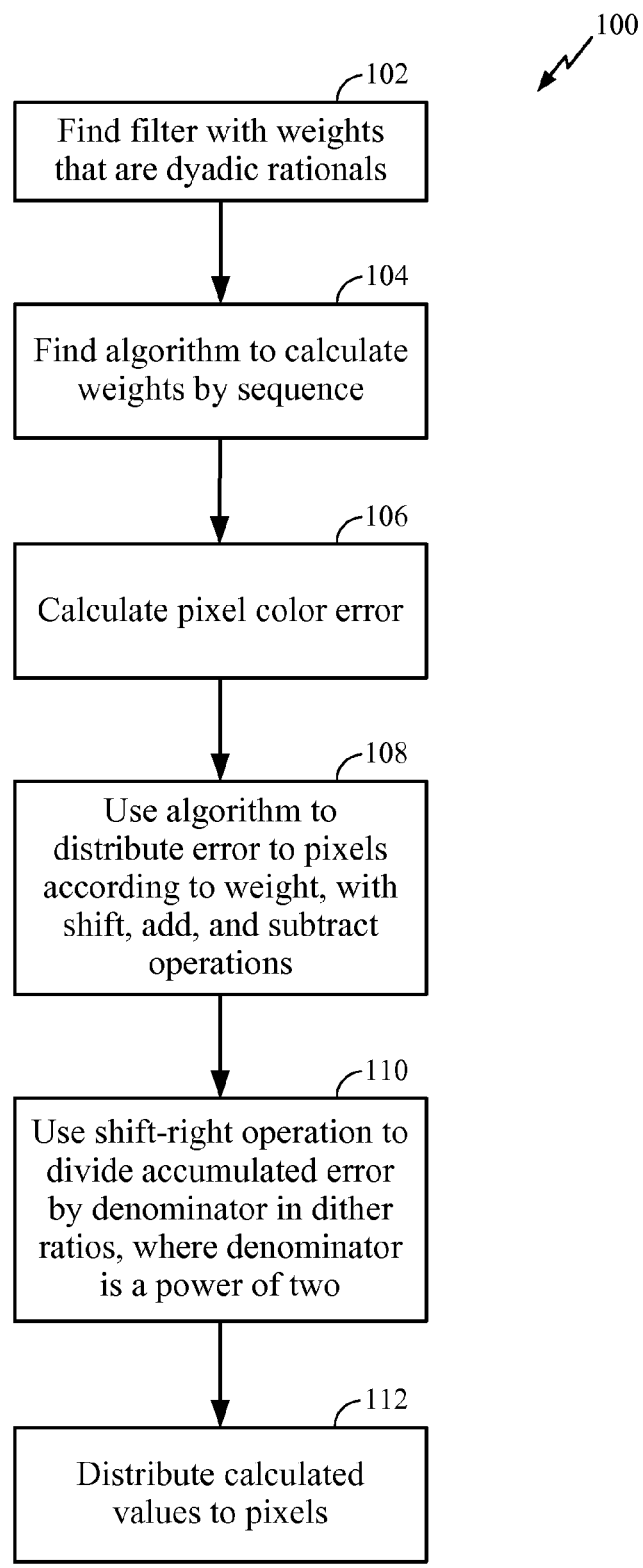
FIG. 1 is a flow diagram of an example process of finding and applying a dithering filter.

In digital imaging, color is quantized into a finite color palette. If, for example, an imaging scheme allocates eight bits to represent the color of a pixel, then the pixel can take on one of 256. ($2^8$) different colors, but does not take on intermediate values between the discrete 256 different colors. Many electronic devices, such as handheld computers and wireless telephones, employ small color palettes. In some cases, these devices employ an imaging scheme with a color depth. (i.e., size of the color palette) of four bits, which allows representation of $2^4$. (=16) different colors in a pixel. However, real-world images exhibit arbitrarily small gradations or variations in color. Images that have been captured with high-definition digital photography may have quantized color palettes, but the gradations in color that can be represented may be very small, and may be much smaller than the platform on which the image is to be displayed. Thus, when a source image is a real-world image or an image that was captured at a high color depth, and the target imaging system has a relatively coarse color palette, color values can be rounded up or down to fit within the constraint of the palette.

When a color is rounded up or down, an error is realized. Thus, if an imaging system employs sixteen colors represented by the integers 0 through 15, and the system determines that a particular pixel should be set to 14.3 in order to accurately represent the source image, then the system can round the color down from 14.3 to 14. This rounding causes the color value of the target pixel to differ from the source image by 0.3, so the error in the target pixel is 0.3. It is possible to disregard the error and simply accept the rounded value without attempting to account for the rounding. In this case, the fact that that the color in the target image differs from the color in the source image by 0.3 constitutes lost information. If there is a low expectation of the target image's quality, then this loss of information may be acceptable. However, in some cases, the loss of information can be severe. For example, if the target imaging scheme has a color palette of two colors—black and white—and the source image is uniformly 51% gray, then rounding will cause each pixel in the target image to appear entirely black. Accounting for the rounding error in some manner could allow some pixels to be set to black and others set to white, so that, when the image is viewed at a distance, it would appear gray.

One way of accounting for the error is a technique known as diffusion dithering. Diffusion dithering accounts for the rounding error by dispersing it to neighboring or nearby pixels in accordance with certain ratios. There are various diffusion dithers, which have been determined experimentally to produce good results. These dithers are described based on where they disperse the error from the pixel that is being examined, and in what quantities that error is dispersed to each pixel. For example, one diffusion dither—the Floyd-Steinberg filter (named after its creators)—can be described as follows:

TABLE 1

|  | * | 7/16 |
| --- | --- | --- |
| 3/16 | 5/16 | 1/16 |

An image can be examined row by row, where each row is examined from left to right, and the rows are examined from top to bottom. The "*" symbol in Table 1 represents the pixel that is being examined. The fractions adjacent to the "*" symbol represent the proportion (or "weight") of the rounding error that is distributed to neighboring pixels. If, for example, the pixel at the "*" is 14.3 and is rounded to 14, then the total error in that pixel is 0.3. 7/16 of that error (0.3× 7/16=0.13125) is distributed to the pixel that is one column to the right and in the same row, 1/16 of the error is distributed to the pixel that is one column to the right and one row down, and so on until the whole error in the "*" (current) pixel is distributed to other pixels. Thus, in the target image, the color value for a given pixel is determined both by the color of the corresponding pixel in the source image, and by how much rounding of color values has occurred in nearby pixels. Each row can be examined from left to right. Or, rows can be examined in a serpentine pattern, alternating from left-to-right and right-to-left with each successive row, in which case the pattern of weights shown in Table 1 is horizontally reversed for rows that are being examined from right to left.

From an efficiency standpoint, the Floyd-Steinberg filter has the property that the denominator in the weights is a power of two: 16 ($=2^4$). (The denominator in the fractions (16) is the sum of the numerators (3+5+1+7=16), so that the sum of all the fractions in the filter adds up to one.) Computing devices can efficiently perform division by a power of two because, in base-2, division by a power of two can be performed by shifting the binary representation of the number to the right by a number of bits that is equal to the exponent in the divisor. Thus, if a binary number, A, is to be divided by $2^n$, this operation can be performed by shifting A to the right by n bits. (Fractional amounts in the quotient are shifted off the end of the register and discarded; thus, division by this method rounds the quotient down to the next lowest integer.) Division by 16 ($=2^4$), for example, can be accomplished by shifting right by four bits, and this right shift is normally implemented by a native machine instruction that can be performed directly within a register. ("Right", in this example is used in the canonical sense, where least significant bit is considered to be on the "right". However, any representation of numbers could be used. For convenience in describing the shifts, "right" and "left" herein refer to canonical right and left, where the least significant bits are described as being toward the "right," and the most significant bits are described as being toward the "left," regardless of how a number is physically represented.)

While the Floyd-Steinberg dither uses a divisor that is a power of two (as do some other known filters, such as the Burkes filter and Sierra3 filter), other dithers have been devised in which the denominator in the weights is not a power of two. For example, the Stucki filter is shown in Table 2.

TABLE 2

|  |  | * | 8/42 | 4/42 |
| --- | --- | --- | --- | --- |
| 2/42 | 4/42 | 8/42 | 4/42 | 2/42 |
| 1/42 | 2/42 | 4/42 | 2/42 | 1/42 |

Filters like the Stucki filter, which employ a more complex distribution of error, may produce better dithered results in some circumstances than simpler filters like the Floyd-Steinberg filter. However, the cost is greater computational complexity. Like in the Floyd-Steinberg filter, the sum of the weights in the Stucki filter add up to one. Since the numerators in the fractions in the filter add up to 42, the denominator in each fraction is 42. Since 42 is not a power to two, applying these fractions to actual error values involves dividing by 42, which is performed through a division operation rather than a simple right-shift of bits. Regardless of whether the division operation is built into the processing hardware or implemented in software, the division operation is more computationally expensive than a right-shift.

In order to allow the right-shift operation to be used for division, it is possible to approximate the weights in a filter using dyadic rationals (or "dyadic fractions")—that is, a set of fractions having a denominator that is a power of two. A technique to approximate the weights in a diffusion-dithering filter is described below in connection with FIG. 2. However, applying a weight to an error value involves multiplication as well as division—that is, the numerator is multiplied by the weight, and the result is divided by the denominator—and this multiplication operation can be another source of inefficiency in the calculation. Multiplication by a power of two can be performed inexpensively with a shift-left operation, but multiplication by a number that is not a power of two may involve computationally-expensive multiplication logic. Some filters, such as Stucki, have numerators that are powers of two, which simplifies the multiply stage of applying a filter weight to an error value. However, some filters (such as Floyd-Steinberg) have weight numerators that are not powers of two. In other cases, a filter that has power-of-two numerators (such as Stucki) would have non-power-of-two numerators when approximated with dyadic rationals. For example, if one seeks to approximate the Stucki filter with fractions whose denominator is 64, then the fractions 1/42, 2/42, 4/42, and 8/42 would be approximated as 2/64, 3/64, 6/64, and 12/64. Among these numerators, two is a power of two, but three, six, and twelve are not. Shift, add, and subtract are computationally-inexpensive operations. Thus, efficiency can be realized by creating an algorithm to multiply the weight numerators by the error value using a series of shifts, adds, and subtracts.

Turning now to the drawings, FIG. 1 shows stages of a process 100, whereby a dyadic approximation of a dithering filter is found and applied. At 102, a filter is found whose weights are dyadic rationals. One way to find such a filter is to select a power of two, and to approximate each fraction in a known filter (e.g., the Stucki filter) by another fraction whose numerator is the selected power of two. Thus, if the number 64 ($=2^6$) is selected, then each fraction in the filter can be multiplied by that number. The product of a fraction in the original filter and the selected number will give the numerator of a new fraction that approximates the original fraction. For example, the Stucki filter contains the fraction 8/42. That fraction multiplied by 64 equals $^{512}/_{42}$, which, rounded to the nearest integer, is 12. Thus, twelve is the numerator in the dyadic rational 12/64 (=0.1875). The original fraction, 8/42, is approximately equal to 0.190476, so 12/64 is a reasonable approximation of the original fraction. A more accurate approximation could be obtained by using a higher power of two as the denominator, and generating approximations of fractions based on that power of two. In one example, a program could be written to approximate the fractions in a filter based on all of the powers of two in some range—e.g., $2^2$ through $2^{10}$. Additionally, while the example above approximates the fraction in a known filter, such as the Stucki filter, the fractions to approximate could be generated in any other manner, such as by using an average of two or more known filters.

For example, the filter created by Jarvis, Judice, and Ninke (the "Jarvice-Judice-Ninke filter", or the "Jarvis filter") is shown in Table 3.

TABLE 3

|      |      | *    | 7/48 | 5/48 |
|------|------|------|------|------|
| 3/48 | 5/48 | 7/48 | 5/48 | 3/48 |
| 1/48 | 3/48 | 5/48 | 3/48 | 1/48 |

This filter has weights in the same positions as the Stucki filter, although the weights are different fractions. One could take the mid-points between the weights in these filters, and one could use the resulting fraction as a weight to be approximated with a dyadic rational. (E.g., for the pixel to the right of the "*" pixel, one could use the arithmetic average of the fractions that the Stucki and Jarvis filters use in that position—$[(7/48)+(8/42)] \div 2 = {}^{113}/_{672}$—and then approximate this new fraction with a dyadic rational).

At 104, an algorithm is found to calculate the numerators in the weights as a sequence of additions, subtractions, and left shifts. An example process of finding such algorithms is discussed below in connection with FIGS. 4-6 and Table 5.

At 106, the color error associated with a pixel is calculated. Thus, if the original color of a pixel is rounded to a color in an available color palette, a rounding error occurs. This rounding error is calculated at 106.

At 108, the algorithms that were found at 104 are used in a diffusion-dithering process to distribute error from one pixel to other pixels. Thus, if Δ is the error associated with rounding a color value in a source image to an available color value in the palette, and if $w_k$ is the numerator in a dyadic fractions from the filter that is to be applied to that error, then the algorithm for calculating $w_k \cdot \Delta$ as a series of left shifts, adds, and subtracts, is applied in order to find that product.

At 110, an accumulated error value is divided by the denominator used in the filter. Thus, since the filter has been chosen to use fractions whose denominator is a power of two, this division can be performed using a right shift operation.

At 112, the values that were calculated at 110 are distributed to pixels in accordance with the filter that is being applied.

Finding an algorithm to calculate weights is computationally intensive. Thus, stages 102 and 104 would normally be performed on a machine with high computational power (e.g., a personal computer with a fast processor or set of processors) in order to generate an efficient algorithm to be carried out on a machine with lower computational power. After the algorithm has been generated, stages 106-112 could be carried out on a different machine (e.g., a wireless phone, a handheld computer, etc.), using the algorithm that had been generated. However, stages 102-112 can be performed in any environment(s) and on any type(s) of machine(s).

Figure 2:
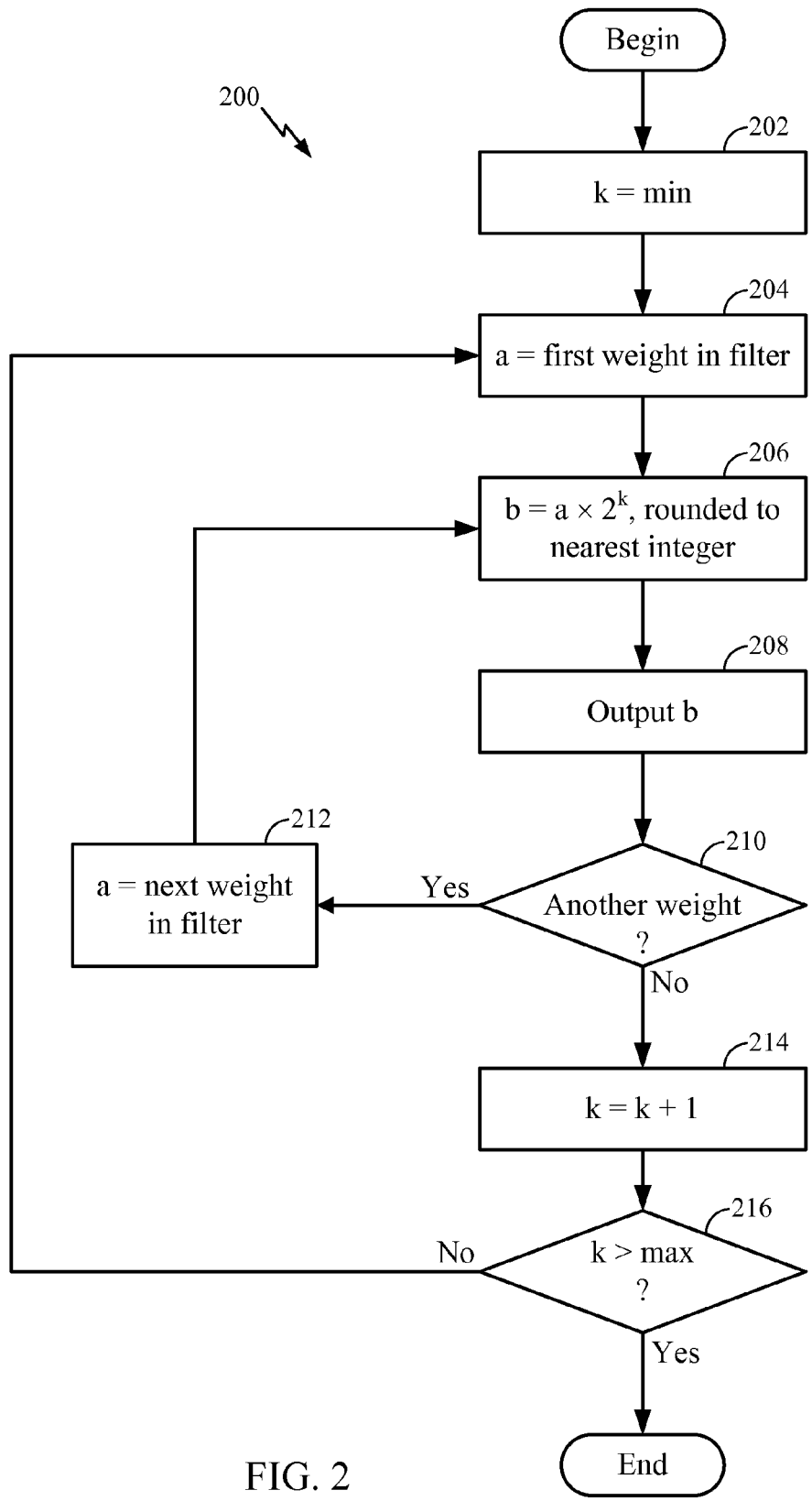
FIG. 2 is a flow diagram of an example process of calculating dyadic rationals to approximate weights in a filter.

FIG. 2 shows an example process 200 of calculating dyadic rationals that approximate weights in a filter. Process 200 is an example way to perform stage 102 in FIG. 1. The filter to be approximated can be an existing filter (e.g., Stucki, Jarvis, etc.), an average of existing filters (e.g., the mid-points between the Stucki and Jarvis weights), or can be chosen in any manner. Process 200 generates approximations of filters having numerators that are powers of two in the range $2^{min}$ to $2^{max}$. In process 200, a, b, and k are variable names. At 202, k is set equal to min. For example, if min=2 and max=10, then the calculation of dyadic approximations of filter weights will begin with weights whose denominator is equal to $2^2$ (=4), and will continue through the series 4, 8, 16, . . . , 1024. At 204, a is set equal to the first weight the filter (e.g., 8/42 in the Stucki filter). At 206, b is set equal to $a \times 2^k$, and is then rounded to the nearest integer. One way to round to the nearest integer is to add 0.5 to $a \times 2^k$, and then use a floor function to truncate the fractional amount to the next lowest integer. However, any rounding mechanism may be used.

At 208, the value of b is outputted. In one example, the value of b is output with the current denominator and the ratio that it approximates. Thus, if process 200 is currently calculating approximations with the denominator $2^6 = 64$ (i.e., if k=6), and if the fraction being approximated is 8/42, then b, as calculated at 206, would be equal to 12, so information such as "12/64 is approximately equal to 8/42" could be provided. However, b can be outputted at 208 in any manner.

At 210, it is determined if there is another weight in the filter. If there is another weight, then a is set equal to the next weight, and process 200 returns to 206 to calculate an approximation of the next weight. If it is determined at 210 that there is not another weight in the filter, then k is incremented (at 214). If k is greater than max (as determined at 216), then process 200 terminates. Otherwise, the process returns to 204 to begin calculating approximations of the filter based on the next value of k.

Once a filter has been found whose weights are dyadic rationals, an algorithm is created to apply the fractions as a sequence of shift-left, add, and subtract operations. For example, Table 4 shows an example filter whose weights are dyadic rationals.

TABLE 4

|      |      | *     | 11/64 | 6/64 |
|------|------|-------|-------|------|
| 4/64 | 6/64 | 11/64 | 6/64  | 4/64 |
| 1/64 | 4/64 | 6/64  | 4/64  | 1/64 |

In Table 4, the numerators are 1, 4, 6, and 11. Since the denominator, 64, was chosen to be a power of two, division can be performed by shifting right by 6 bits ($64=2^6$). Thus, to find an algorithm that is efficient at applying these ratios, a search is made for ways to multiply an error value by the numerator using shift-left, add, and subtract operations. For example, if $w_n$ represents a particular value that can be achieved using shift-left, add, and subtract operations, then the following is an example of an algorithm to multiply by 1, 4, 6, and 11 (where "<<" represents the shift-left operation, so x<<y means x shifted left by y bits):

$$w_0=1;$$

$$w_1=w_0<<2; (=4)$$

$$w_2=w_0+w_1; (=5)$$

$$w_3=w_0+w_2; (=6)$$

$$w_4=w_2+w_3; (=11)$$

Thus, given a starting value of $w_0$, this algorithm shows how to multiply by 4, 5, 6, and 11 using left-shift and add operations. In this case, 5 is not one of the values in the numerators, but it is an intermediate value that can be used to calculate other values (e.g., $w_2=5$ appears in the formula for calculating $w_4=11$). Thus, in order to multiply number by, say, 6 ($=w_3$), one can set $w_0$ equal to the number that is to be multiplied by 6, and then apply the equations given above as follows:

$$w_3=w_0+w_2$$

$$w_3=w_0+(w_0+w_1)$$

$$w_3=w_0+(w_0+(w_0<<2))$$

Thus, in order to multiply, e.g., 9×6, $w_0$ is set equal to 9, and the solution to $w_3$ is the product:

$$w_3=9+(9+(9<<2))$$

$$w_3=9+(9+(36))$$

$$w_3=54,$$

which is the solution to 9×6. The solution is calculated using two add operations and one shift operation.

Figure 3:
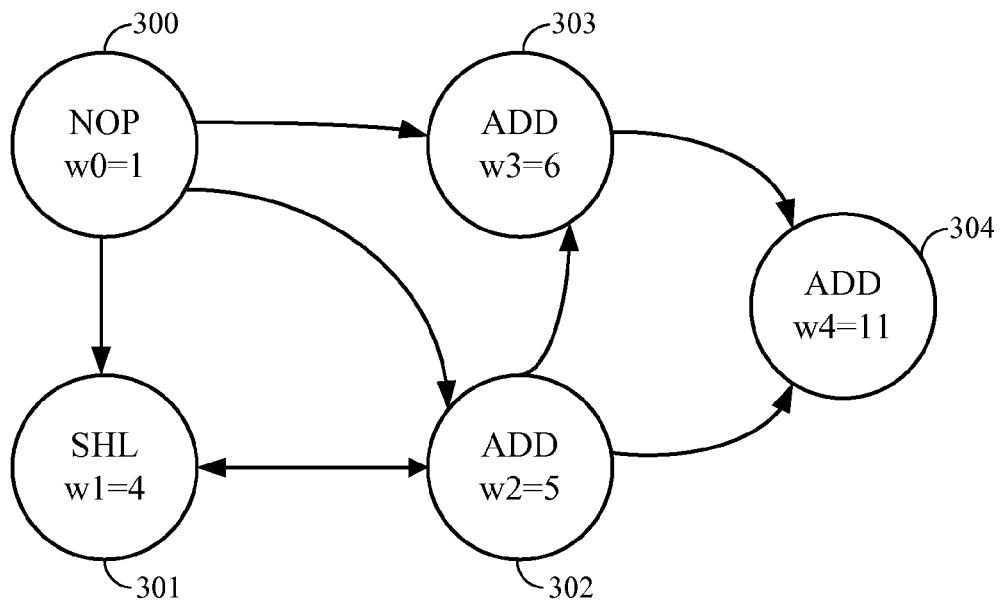
FIG. 3 is a graph of dependencies in an example algorithm.

The complexity of an algorithm can be modeled as a graph of its dependencies. FIG. 3 shows a graph of the dependencies in the above-described algorithm. The graph of FIG. 3 has nodes 300, 301, 302, 303, and 304, corresponding to factors $w_0$ through $w_4$. The graph shows each node's dependencies on other nodes. Thus, node 300 ($w_0$) is a base value of the system, and does not depend on a calculation from any other node's value. ("NOP" stands for "no operation," indicating that base node 300 is generated without performing operations on other nodes.) Node 301 ($w_1$) is dependent on node 300, and is obtained by performing a shift-left operation ("SHL") on the value of node 300. Node 302 ($w_2$) is obtained by performing an add operation ("ADD") on the values of node 301 and 300. And so on, up to node 304. It can be seen from the graph that node 304, which is the most outlying node in the graph, is dependent, either directly or indirectly, on the values of nodes 300-303. Thus, the value at node 304 is obtained by calculating the values at nodes 301, 302, and 303 (involving one shift and two adds), and then performing an additional add operation with nodes 302 and 303 as the operands. Thus, the most complex calculation in the algorithm involves three add operations and one shift operation.

In order to find an algorithm, one starts with the factors that one wants to be able to calculate—e.g., the numerators 1, 4, 6, and 11 as in the above filter. Then a search is performed for calculations that lead to these factors. After calculations for the full set of factors have been found, those calculations are collected together as an algorithm. The complexity of the algorithm is compared to other known algorithms that produce those factors. Complexity may be determined, for example, based on how many operations are in the longest path used to reach one of the factors. Or, the complexity can be based on more particularized criteria, such as an individual limit on the number of add operations or shift operations, or a limit on the number of bits to be shifted. The output of the search is a set of algorithms. Each algorithm is a set of calculations (such as those described above for $w_0$ through $w_4$) that include formulae to produce the full set of factors sought, and possibly some intermediate values used in those calculations.

Figure 4:
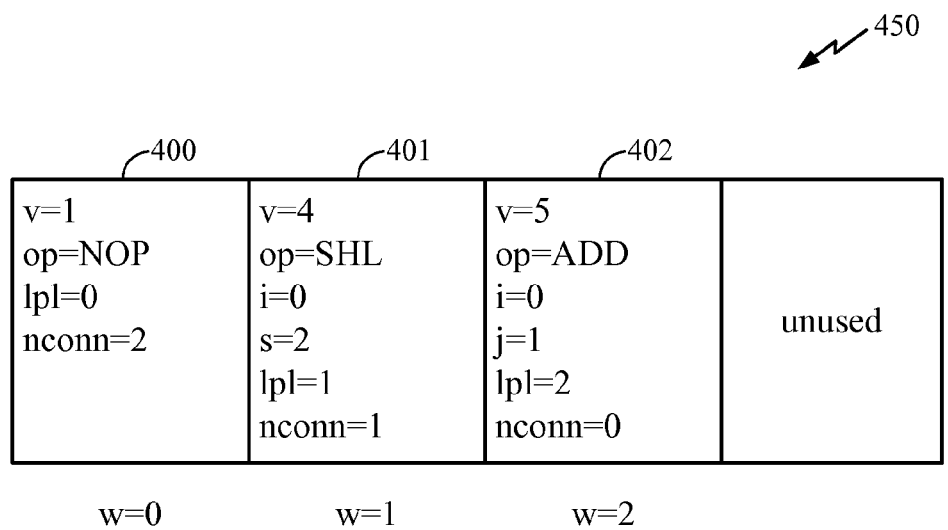
FIG. 4 is a block diagram of an example array.

As part of the process of searching for algorithm, a "dictionary" is created, which stores the current stack of operations that can be used to generate various values. The dictionary starts with a base value of one, and an expansion process is used to add operations to the dictionary that produce the factors being sought. The expansion process is discussed more particularly below. Before turning to a discussion of the expansion process, the dictionary and its data structures are first explained. The dictionary can be represented as an array, where each element in the array contains a particular value, and also contains the operation that is performed to reach the current value as a function of other values in the dictionary. FIG. 4 shows an array 450, which comprises a plurality of elements. In the example state of the array shown in FIG. 4, array 450 has three elements, 400, 401, and 402, representing the factors $w_0$, $w_1$, and $w_2$ in the example previously discussed.

Element 400 corresponds to factor $w_0$. It has a value of 1, it is obtained by performing the operation "NOP". ("NOP" represents "no operation"—i.e., $w_0$ is obtained without performing an operation on other elements, since $w_0$ is the base value on which other values are based.) In element 400, "lpl" represents the "longest path length" leading to the factor represented by that element, which is equal to zero for element 400 since $w_0$ is the base value of the system and no path is used to reach it. "nconn" represents the "number of connections" from that element to other elements. As discussed subsequently, element 400 is used to compute elements 401 and 402, so nconn in element 400 is equal to 2, representing the fact that there are two other elements that depend on element 400. (In the graph shown in FIG. 3, a node's "nconn" value would correspond to the number of edges leading away from that node.)

Element 401 corresponds to the factor $w_1$, and has a value of 4. The "op" field in element 401 is equal to "SHL" ("shift left"). Element 401 has a value "i=0", meaning that the 0-th element in array 450 (element 400) is the operand of the operation. Element 401 also has a value "s=2", representing the number of bits that the value of the operand is to be shifted to yield the value of element 401. Element 401 has an "lpl" value equal to one, representing that there the length of the operation path leading from the base element 400 to element 401 is one—i.e., one shift operation. Element 401 also has an "nconn" value equal to one, representing that one other element relies on the value of element 401. (In this example, element 402 relies on element 401.)

Element 402 corresponds to factor $w_2$, and has a value of 5. The "op" field in element 401 is equal to "ADD" (addition between two other elements). Element 401 has values "i=0" and "j=1", meaning that the 0-th and 1-st elements in array 450 (elements 400 and 401) are the operands of the "ADD" operation. Thus, the value of element 402 is obtained by adding the values of elements 400 and 401. Element 402 has an "lpl" value of two, meaning that two operations are used to reach element 402 from the base element 400 (i.e., the SHL operation used to calculate element 401 from element 400, and the ADD operation used to calculate element 402 from the values at elements 400 and 401). Element 402 has an "nconn" value equal to zero, meaning that element 402 is a leaf in the graph: no other elements rely on the value calculated at element 402 in order to calculate their values.

Figure 5:
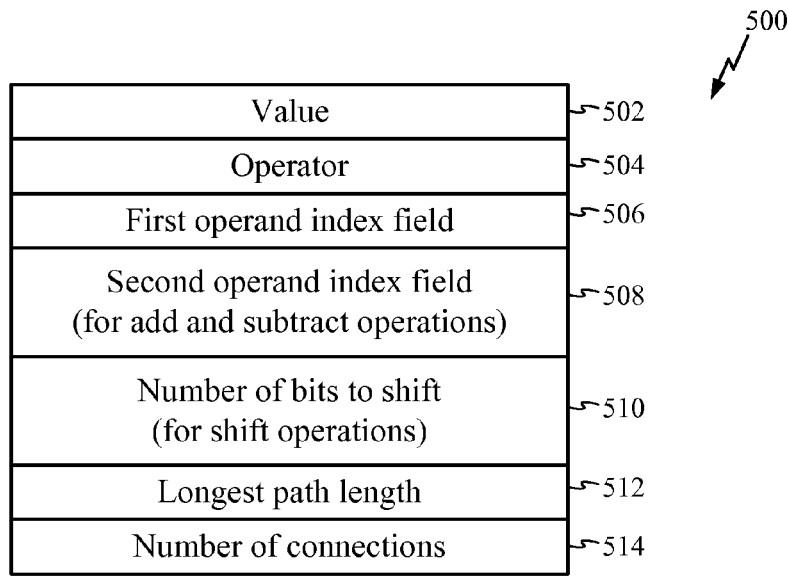
FIG. 5 is a block diagram of an example data structure that may be used as elements in the array of FIG. 4.

FIG. 5 shows an example data structure 500 that may be used for the elements in array 450 of FIG. 4. Data structure 500 includes a value field 502, an operator field 504, a first index field 506, a second index field 508, a field 510 to store the number of bits to shift in a shift operation, a field 512 to store the longest path length ("lpl") value, and a field 514 to store the number of connections ("nconn") value. Each instance of data structure 500 represents a factor, which may be a factor that is being searched for to implement a filter, or may be an intermediate value.

Field 502 stores the value of the factor represented by the element. For example, if an element represents the base factor $w_0$, then the value in that element would be one.

Field 504 stores the operator that is used to achieve the elements value from other elements. For example, field 504 can store values such as "SHL" (shift left), "ADD" (add), "SUB" (subtract), and "NOP" (no operation). These operations may, for example, be represented in data structure 500 by different integers, which can be symbolically associated with the names "SHL," "ADD," "SUB," and "NOP." NOP is a placeholder operation, which indicates that the element is derived without performing an operation on any other element. The NOP operation is used for the first element in the array, which is the base value of $w_0$ (=1), from which other elements in the array are either directly or indirectly derived.

Fields 506 and 508 store the indices, into the dictionary array, of the operand(s) of a given operation. For example, ADD and SUB operations take two operands, both of fields 506 and 508 would have a defined value for an ADD or SUB operation. If fields 506 and 508 have the values m and n, and field 504 has the value ADD, this scenario means that the current element in the array is calculated by adding the m-th element and the n-th element.

The SHL operation takes one operand, so, in the case where field 504 has the value SHL, field 506 can store the index of the operand, and field 508 can be left blank. In the case where field 504 has the value SHL, the number of bits to be shifted is stored in field 510. Thus, if field 504 has the value SHL, field 506 has the value m, and field 510 has the value n, this scenario means that the current element in the array is calculated by shifting the value of the m-th element in the array n bits to the left.

Field 512 stores the length of the path that it takes to reach the element from the base element ($w_0$). This field holds the "lpl" value that was previously described. Thus, if the current element is the base element, the value of field 512 is zero, since it takes no operations to reach $w_0$ from $w_0$. For other elements, the value of field 512 is set to one greater than the "lpl" values in the element's operands (or one greater than the "lpl" value in the element's operand, in the case of an SHL operation that has a single operand).

Field 514 stores the number of outbound connections that an element has—that is, the number of other elements that use the current element as an operand. This field is the "nconn" value previously discussed, and it is used for bookkeeping during the search for algorithms, to determine which elements represent leaves, or "childless nodes," in the graph.

A dictionary that comprises an array of instances of data structure 500 represents known factors that can be reached. When the array contains elements that have all of the factors that are being searched for, the contents of the array constitutes an algorithm to generate those factors. Thus, to find algorithms to generate those factors, the array is initialized with the base element ($w_0$) by setting the zero-th element in the array to have a value of one. Then, the array is populated with various values reached through various combinations of operations. When the array reaches a state in which it contains the factors that are being searched, the contents of the array are captured. The captured contents can be saved as an algorithm. Or, the efficiency of the algorithm can be compared with previously-discovered algorithms, and the algorithm can be saved if it is more efficient that the previous algorithms. After one or more algorithms have been generated, one of the algorithms can be chosen to calculate the factors in a dithering filter.

Figure 6:
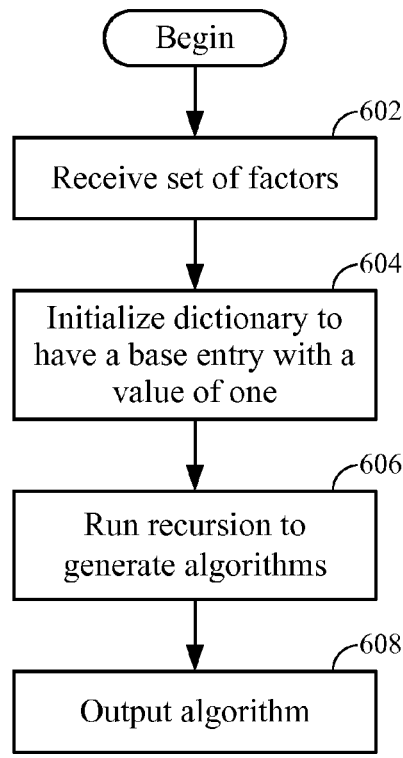
FIG. 6 is a flow diagram of an example process of generating algorithms.

FIG. 6 is a flow diagram of an example process of generating algorithms. At 602, a set of factors to be generated is received. At 604, the dictionary is initialized to have a base entry ($w_0$), whose value is one, and that does not have other elements in the dictionary as its operands. At 606, a recursion is performed to generate operations and new values for the dictionary, and to save algorithms that generate the factors that were received at 602. An example of a recursive method of populating the dictionary is described below in pseudo-code. At 608, the algorithms discovered by the recursion are outputted.

Table 5 shows pseudo-code of an example recursion that can be used to generate operations and new values for the dictionary. The example recursion performs what could be viewed as an "exhaustive" search in that it tries all combinations of operations on the dictionary, with certain parameters. However, the search for algorithms need not be performed by the algorithm shown below, but can be performed by any method, whether or not such method is "exhaustive."

TABLE 5

```
Function expand( ) {
   /* try shifts */
   for each entry i in the dictionary {
      for k = 1 to (max_bit_length – msb _position_of(i.value)) {
         try adding new entries that shift the i.value to the left by k bits;
         if entry duplicates a value that is already in the dictionary then
            remove the top entry;
         else if the dictionary still does not have all the values sought
         then {
            expand( ); // continue trying to find the next value
            remove the top entry; // unwind the stack after returning
   from the recursion
         }
         else { // dictionary has all the factors being sought
            if the current algorithm is at least as efficient as the
   saved algorithms then {
               save the current contents of the dictionary as a
               new algorithm; remove the top entry;
            }
         }
      }
   }
   /* try adds */
   for each pair (i,j) of entries in the dictionary, where i ≠ j {
      try adding new entries that are the sum of i.value + j.value;
      if entry duplicates a value that is already in the dictionary then
         remove the top entry;
      else if the dictionary still does not have all the values sought then {
         expand( ); // continue trying to find the next value
         remove the top entry; // unwind the stack after returning from
         the recursion
      }
      else { // dictionary has all the factors being sought
         if the current algorithm is at least as efficient as the saved
         algorithms then {
```

TABLE 5-continued

```
            save the current dictionary as a new algorithm;
            remove the top entry;
         }
      }
   }
}
/* try subtracts */
// Similar to "try adds", but tries to add element that subtract one
//      existing element from another instead of adding two
   existing elements
}
```

The expand( ) function in Table 5 attempts to expand the dictionary by adding new operations based on existing entries. As noted in FIG. 6 (at 604), the dictionary is initialized to have a base entry whose value is one, which "bootstraps" the expand( ) function of Table 5 by giving it one entry to operate on. Then, given any state of the dictionary, the expand( ) function attempts to add new entries to the dictionary by doing the following:

For each entry in the dictionary, expand( ) tries to add a new operation that left-shifts the entry. Thus, if there is an entry in the dictionary that has a value of 1, expand( ) tries to add operations that shift that value by 1, 2, 3, . . . bits to the left. There may be a "max_bit_length" of values that are being sought (e.g., the process may be set to look for values that have 10 or fewer significant bits), and the for-loop condition "k=1 to (max_bit_length−msb_position_of(i.value))" ensures that expand( ) does not shift the most significant bit beyond the "max_bit_length" limit.

For each distinct pair of entries in the dictionary, expand( ) tries to add a new operation that adds the values in the pair of entries.

For each distinct pair of entries in the dictionary, expand( ) tries to add a new operation that subtracts the value of one entry from the value of the other entry.

After an attempt is made to add a new entry, expand( ) performs various tests:

If the added entry duplicates a value that is already seen in the dictionary, then the added entry is removed, so that the dictionary does not contain two separate paths to the same value. (The added entry is on "top" of the dictionary, so this removal is accomplished by removing the top entry.)

If the added entry does not duplicate a value that exists, then the set of values in the dictionary entries is compared with the set of factors that is being sought. If, after addition of the entry, the dictionary still does not contain all of the factors that are being sought, then expand( ) calls itself recursively to add more values to the dictionary. After the recursive call, expand( ) removes the entry that was added before the recursive call. This removal causes the stack of operations represented by the dictionary to unwind as recursive calls return.

If the new value added causes the dictionary to contain all of the factors that are being sought, then expand( ) determines whether the current state of the dictionary is to be saved as a new algorithm. Expand( ) determines whether the current algorithm is at least as efficient as other algorithms that have already been saved. (If there are no other algorithms, then the current algorithm is the most efficient and is saved.) Efficiency can be determined by various criteria, such as determining the longest path length (i.e., number of operations) that an algorithm uses to reach any value, where longer paths lengths are less efficient than shorter ones.

The following is a description of one or more example environments in which the subject matter herein may be deployed.

Figure 7:
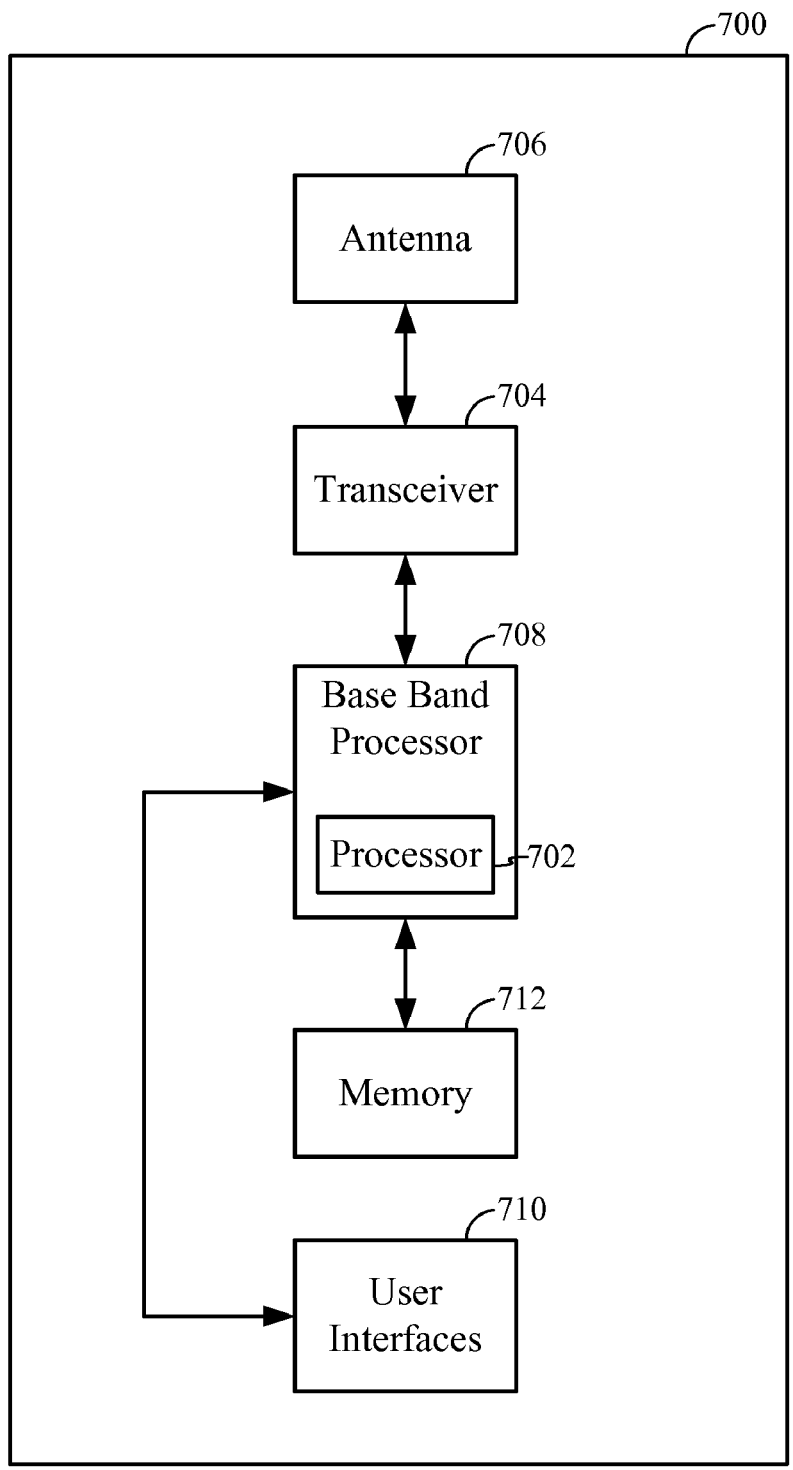
FIG. 7 is a block diagram of a configuration of an example wireless device or terminal.

With reference now to FIG. 7, illustrated is a conceptual block diagram of a possible configuration of a wireless device or terminal 700, such as a handset. As those skilled in the art will appreciate, the configuration of the terminal 700 may vary depending on factors such as the specific application, overall design constraints, etc. Processor 702 can implement the systems and methods disclosed herein.

Terminal 700 can be implemented with a front-end transceiver 704 coupled to an antenna 706. Front-end transceiver 704 is configured to receive a data communication. Base band processor 708 can be coupled to transceiver 704. Base band processor 708 can be implemented with a software-based architecture, or other types of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 700 can also include various user interfaces 710 coupled to the base band processor 708. User interfaces 710 can include a keypad, mouse, touch screen, display, ringer, vibrator, audio speaker, microphone, camera, and/or other input/output devices.

Base band processor 708 comprises a processor 702. In a software-based implementation of base band processor 708, processor 702 may be a software program running on a microprocessor. However, processor 702 is not limited to this implementation, and may be implemented by a variety of means known in the art, including hardware configurations, software configuration, or combination thereof, which are capable of performing the various functions described herein. Processor 702 can be coupled to memory 712 for the storage of data. Memory 712 is configured to store the program data received during a manufacturing and/or test process and the processor 702 or 708 is configured to be programmed with the program data.

The embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

The stages of a method or algorithm described in connection with the embodiments disclosed herein may be embodied directly in hardware, in a software module executed by a processor, or in a combination of the two. A software module may reside in random access memory ("RAM"), flash memory, read-only memory ("ROM"), erasable programmable read-only memory ("EPROM"), electrically-erasable programmable read-only memory ("EEPROM"), registers, a hard disk, a removable disk, a CD-ROM, or any other form of storage medium known in the art. An example storage medium is coupled to the processor, such that the processor can read information from, and write information to, the storage medium. In the alternative, the storage medium may be integral to the processor. The processor and the storage medium may reside in an application-specific user circuit ("ASIC"). The ASIC may reside in a user terminal. In the alternative, the processor and the storage medium may reside as discrete components in a user terminal.

It should be noted that the methods described herein may be implemented on a variety of hardware, processors and systems known by one of ordinary skill in the art. For example, a machine that is used in an implementation may have a display to display content and information, a processor to control the operation of the client and a memory for storing data and programs related to the operation of the machine. In some implementations, the machine is a cellular phone. In some implementations, the machine is a handheld computer or handset having communications capabilities. In another implementation, the machine is a personal computer having communications capabilities.

The various illustrative logics, logical blocks, modules, and circuits described in connection with the implementations disclosed herein may be implemented or performed with a general purpose processor, a DSP, an ASIC, a field programmable gate array (FPGA) or other programmable logic device, discrete gate or transistor logic, discrete hardware components, or any combination thereof designed to perform functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of processing an image, the method comprising:
using at least one of one or more processors, calculating an error based on a difference between a color of a first pixel in the image and a color value selected from a color palette, wherein said color value is based on said color;
using at least one of the one or more processors, calculating a first set of products of said error and each of a plurality of weights in a filter, wherein the filter associates each of the weights with one of a plurality of nearby pixels to the first pixel, wherein the weights in said filter are dyadic rationals that equal or approximate weights that are derived from a combination of any two or more component filters selected from among a Floyd-Steinberg filter, a Burkes filter, a Sierra 3 filter, a Jarvis-Judice-Ninke filter, or a Stucki filter, wherein the weights in each of a plurality of weight positions in the filter are an arithmetic average of filter weights in corresponding weight positions in each of the component filters, and wherein calculating the first set of products comprises applying a selected algorithm that applies a sequence of one or more shift, add, or subtract operations to a base value or a previously calculated one of the products, wherein the selected algorithm has been selected for having a lower complexity of shift, add, or subtract operations than one or more other potential algorithms for applying the plurality of weights, according to an efficiency criterion; and
using at least one of the one or more processors, distributing said first set of products to the nearby pixels in accordance with said filter.

2. The method of claim 1, wherein each of the weights is represented by a numerator and a denominator, and wherein said calculating of said first set of products of said error and each of the weights comprises:
calculating an intermediate set of products of each of the numerators and said error; and
calculating said first set of products based on said intermediate set of products and said denominator.

3. The method of claim 2, wherein said calculating of said intermediate set of products comprises applying one or more operations, each consisting of a left shift, add, or subtract operation to a base numerator or a previously calculated one of the intermediate products, in accordance with the selected algorithm.

4. The method of claim 3, wherein said calculating of said weights further comprises:
using said error as said base numerator;
applying one or more of the operations to said base numerator in accordance with the selected algorithm, thereby calculating a respective one of the second intermediate products;
applying one or more of the operations to the respective one of the second intermediate products or a subsequent one of the second intermediate products in accordance with the selected algorithm, until all of the second intermediate products are calculated; and
applying a right-shift operation, by an amount equal to a selected integer variable, to each of said intermediate set of products, thereby calculating said first set of products, wherein said denominator is equal to 2 to the power of said selected variable.

5. The method of claim 1, wherein the weights in said filter are dyadic rationals that equal or approximate weights that are derived from a Jarvis-Judice-Ninke filter, a Stucki filter, a Floyd-Steinberg filter, a Burkes filter, or a Sierra 3 filter, or a combination of any two or more of a Floyd-Steinberg filter, a Burkes filter, a Sierra 3 filter, a Jarvis-Judice-Ninke filter, or a Stucki filter.

6. One or more non-transitory computer-readable media comprising executable instructions to perform a method of processing an image, the method comprising:
calculating an error based on a difference between a color of a first pixel in the image and a color value selected from a color palette, wherein said color value is based on said color;
calculating a first set of products of said error and each of a plurality of weights in a filter, wherein the filter associates each of the weights with one of a plurality of nearby pixels to the first pixel, wherein the weights in said filter are dyadic rationals that equal or approximate weights that are derived from a combination of any two or more component filters selected from among a Floyd- Steinberg filter, a Burkes filter, a Sierra 3 filter, a Jarvis-Judice-Ninke filter, or a Stucki filter, wherein the weights in each of a plurality of weight positions in the filter are an arithmetic average of filter weights in corresponding weight positions in each of the component filters, and wherein calculating the first set of products comprises applying a selected algorithm that applies a sequence of one or more shift, add, or subtract operations to a base value or a previously calculated one of the products, wherein the selected algorithm has been selected for having a lower complexity of shift, add, or subtract operations than one or more other potential algorithms for applying the plurality of weights, according to an efficiency criterion; and distributing said first set of products to the nearby pixels in accordance with said filter.

7. The one or more non-transitory computer-readable media of claim 6, wherein each of the weights is represented by a numerator and a denominator, and wherein said calculating of said first set of products of said error and each of the weights comprises:

calculating an intermediate set of products of each of the numerators and said error; and calculating said first set of products based on said intermediate set of products and said denominator.

8. The one or more non-transitory computer-readable media of claim 7, wherein said calculating of said intermediate set of products comprises applying one or more operations, each consisting of a left shift, add, or subtract operation to a base numerator or a previously calculated one of the intermediate products, in accordance with the selected algorithm.

9. The one or more non-transitory computer-readable media of claim 8, wherein said calculating of said weights further comprises:

using said error as said base numerator;

applying one or more of the operations to said base numerator in accordance with the selected algorithm, thereby calculating a respective one of the second intermediate products;

applying one or more of the operations to the respective one of the second intermediate products or a subsequent one of the second intermediate products in accordance with the selected algorithm, until all of the second intermediate products are calculated; and applying a right-shift operation, by an amount equal to a selected integer variable, to each of said intermediate set of products, thereby calculating said first set of products, wherein said denominator is equal to 2 to the power of said selected variable.

10. An apparatus to process an image, the apparatus comprising:

a memory for storing data encoding at least a portion of the image; and at least one processor, in communication with the memory, that carries out logic to calculate an error based on a difference between a color of a first pixel in the image and a color value selected from a color palette, wherein said color value is based on said color; to calculate a first set of products of said error and each of a plurality of weights in a filter, wherein the filter associates each of the weights with one of a plurality of nearby pixels to the first pixel, wherein the weights in said filter are dyadic rationals that equal or approximate weights that are derived from a combination of any two or more component filters selected from among a Floyd-Steinberg filter, a Burkes filter, a Sierra 3 filter, a Jarvis-Judice-Ninke filter, or a Stucki filter, wherein the weights in each of a plurality of weight positions in the filter are an arithmetic average of filter weights in corresponding weight positions in each of the component filters, and wherein calculating the first set of products comprises applying a selected algorithm that applies a sequence of one or more shift, add, or subtract operations to a base value or a previously calculated one of the products, wherein the selected algorithm has been selected for having a lower complexity of shift, add, or subtract operations than one or more other potential algorithms for applying the plurality of weights, according to an efficiency criterion; and to distribute said first set of products to the nearby pixels in accordance with said filter.

11. The apparatus of claim 10, wherein each of the weights is represented by a numerator and a denominator, and wherein said logic calculates said first set of products of said error and each of the weights by calculating an intermediate set of products of each of the numerators and said error, and calculating said first set of products based on said intermediate set of products and said denominator.

12. The apparatus of claim 11, wherein said logic applies one or more operations, each consisting of a left shift, add, and subtract operation to a base numerator or a previously calculated one of the intermediate products, in accordance with the selected algorithm, to calculate said intermediate set of products.

13. The apparatus of claim 12, wherein said logic calculating said weights further comprises:

using said error as said base numerator;

applying one or more of the operations to said base numerator in accordance with the selected algorithm, thereby calculating a respective one of the second intermediate products;

applying one or more of the operations to the respective one of the second intermediate products or a subsequent one of the second intermediate products in accordance with the selected algorithm, until all of the second intermediate products are calculated; and applying a right-shift operation, by an amount equal to a selected integer variable, to each of said intermediate set of products, thereby calculating said first set of products, wherein said denominator is equal to 2 to the power of said selected variable.

14. The apparatus of claim 10, wherein the weights in said filter are dyadic rationals that equal or approximate weights that are derived from a Jarvis-Judice-Ninke filter, a Stucki filter, a Floyd-Steinberg filter, a Burkes filter, or a Sierra 3 filter, or a combination of any two or more of a Floyd-Steinberg filter, a Burkes filter, a Sierra 3 filter, a Jarvis-Judice-Ninke filter, or a Stucki filter.

15. The apparatus of claim 10, wherein the apparatus is a handset.

16. The apparatus of claim 10, wherein the apparatus is an integrated circuit.

17. An apparatus for processing an image, the apparatus comprising:

means for calculating an error based on a difference between a color of a first pixel in the image and a color value selected from a color palette, wherein said color value is based on said color;

means for calculating a first set of products of said error and each of a plurality of weights in a filter, wherein the filter associates each of the weights with one of a plurality of nearby pixels to the first pixel, wherein the weights in said filter are dyadic rationals that equal or approximate weights that are derived from a combination of any two or more component filters selected from among a Floyd-Steinberg filter, a Burkes filter, a Sierra 3 filter, a Jarvis-Judice-Ninke filter, or a Stucki filter, wherein the weights in each of a plurality of weight positions in the filter are an arithmetic average of filter weights in corresponding weight positions in each of the component filters, and wherein calculating the first set of products comprises applying a selected algorithm that applies a sequence of one or more shift, add, or subtract operations to a base value or a previously calculated one of the products, wherein the selected algorithm has been selected for having a lower complexity of shift, add, or subtract operations than one or more other potential algorithms for applying the plurality of weights, according to an efficiency criterion; and means for distributing said first set of products to the nearby pixels in accordance with said filter.

18. The apparatus of claim 17, wherein each of the weights is represented by a numerator and a denominator, and wherein said means for calculating said first set of products of said error and each of the weights comprise:

means for calculating an intermediate set of products of each of the numerators and said error; and means for calculating said first set of products based on said intermediate set of products and said denominator.

19. The apparatus of claim 18, wherein said means for calculating said intermediate set of products comprises:

means for applying one or more operations, each consisting of a left shift, add, or subtract operation to a base numerator or a previously calculated one of the intermediate products, in accordance with the selected algorithm.

20. The apparatus of claim 19, wherein said means for calculating said first set of products of said error and each of the weights comprise comprises:

means for using said error as said base numerator;

means for applying one or more of the operations to said base numerator in accordance with the selected algorithm, thereby calculating a respective one of the second intermediate products;

means for applying one or more of the operations to the respective one of the second intermediate products or a subsequent one of the second intermediate products in accordance with the selected algorithm, until all of the second intermediate products are calculated; and means for applying a right-shift operation, by an amount equal to a selected integer variable, to each of said intermediate set of products, thereby calculating said first set of products, wherein said denominator is equal to 2 to the power of said selected variable.

21. The method of claim 1, wherein the weights in said filter are dyadic rationals that approximate weights that are derived from an averaging of each of the weights in each of a plurality of weight positions in one or more component filters, wherein at least one of the component filters comprises at least one weight with a non-dyadic denominator.

22. The method of claim 21, wherein the at least one of the component filters that comprises at least one weight with a non-dyadic denominator comprises a Jarvis-Judice-Ninke filter or a Stucki filter.

* * * * *